(12) United States Patent  
Duchesne et al.

(10) Patent No.: US 9,286,547 B2  
(45) Date of Patent: Mar. 15, 2016

(54) QUALITY CONTROL AND ASSURANCE OF IMAGES

(75) Inventors: Simon Duchesne, Quebec (CA); Fernando Valdivia, Quebec (CA); Burt Crépault, Quebec (CA)

(73) Assignee: UNIVERSITÉ LAVAL, Quebec (CA)

( * ) Notice: Subject to any disclaimer, the term of this patent is extended or adjusted under 35 U.S.C. 154(b) by 87 days.

(21) Appl. No.: 14/128,328

(22) PCT Filed: Jun. 26, 2012

(86) PCT No.: PCT/CA2012/050427  
§ 371 (c)(1),  
(2), (4) Date: Dec. 22, 2013

(87) PCT Pub. No.: WO2013/000081  
PCT Pub. Date: Jan. 3, 2013

(65) Prior Publication Data  
US 2014/0126790 A1  May 8, 2014

Related U.S. Application Data

(60) Provisional application No. 61/501,250, filed on Jun. 26, 2011.

(51) Int. Cl.  
*G06K 9/00* (2006.01)  
*G06K 9/62* (2006.01)  
*G06T 7/00* (2006.01)

(52) U.S. Cl.  
CPC ............ *G06K 9/6262* (2013.01); *G06T 7/0002* (2013.01); *G06T 7/0014* (2013.01);  
(Continued)

(58) Field of Classification Search  
CPC combination set(s) only.  
See application file for complete search history.

(56) References Cited

U.S. PATENT DOCUMENTS 5,638,465 A * 6/1997 Sano et al. .................... 382/281  
7,705,881 B2 * 4/2010 Okamoto et al. ............. 348/180  
(Continued)

FOREIGN PATENT DOCUMENTS

WO  WO 2010/088763 A1  8/2010

OTHER PUBLICATIONS

Duchesne, S., et al., MRI-Based Automated Computer Classification of Probable AD Versus Normal Controls. IEEE Trans Med Imaging, 2008. 27(4): p. 509-520.

(Continued)

*Primary Examiner* — Anand Bhatnagar  
(74) *Attorney, Agent, or Firm* — Anglehart et al.

(57) ABSTRACT

Applicants have discovered a multi-layer quality control/quality assurance system that provides higher quality data, without human intervention, by rejecting images that do not achieve a pre-determined quality threshold. In some embodiments of the present invention, there is provided a new method of processing an image from a data set through a pipeline wherein quality control/assurance allows to determine a quality of the image processing, the method comprising; receiving a test image; pre-processing the test image; registering the test image to a reference image; calculating a test image quality using a correlation of image intensity values between corresponding locations of the test image and the reference image; providing a plurality of training images and calculating training image quality distribution statistics for the training images with respect to the reference image; and relating the test image quality to the training image quality distribution.

20 Claims, 7 Drawing Sheets

(52) U.S. Cl.
CPC .......... G06T2207/10088 (2013.01); G06T 2207/20076 (2013.01); G06T 2207/20081 (2013.01); G06T 2207/30016 (2013.01); G06T 2207/30168 (2013.01)

(56) References Cited

U.S. PATENT DOCUMENTS

| | | | | |
|---|---|---|---|---|
| 7,957,561 | B2* | 6/2011 | Joung et al. | 382/112 |
| 2001/0012395 | A1* | 8/2001 | Michael et al. | 382/152 |
| 2008/0137968 | A1* | 6/2008 | Joung et al. | 382/218 |
| 2009/0097729 | A1* | 4/2009 | Venkatachalam et al. | 382/132 |
| 2011/0216951 | A1* | 9/2011 | Ye et al. | 382/128 |
| 2012/0053447 | A1* | 3/2012 | Duchesne | 600/410 |
| 2012/0191287 | A1* | 7/2012 | Shin et al. | 701/28 |
| 2012/0269441 | A1* | 10/2012 | Marchesotti et al. | 382/195 |
| 2012/0307116 | A1* | 12/2012 | Lansel et al. | 348/273 |
| 2013/0265595 | A1* | 10/2013 | Liu et al. | 358/1.9 |

OTHER PUBLICATIONS

PCT/CA2012/050427 international preliminary report.
PCT/CA2012/050427 international search report with claims.
Simmons, A., et al., The AddNeuroMed framework for multi-centre MRI assessment of Alzheimer's disease: experience from the first 24 months. Int J Geriatr Psychiatry. 26(1): p. 75-82. abstract.
Zijdenbos, A.P., R. Forghani, and A.C. Evans, Automatic "pipeline" analysis of 3-D MRI data for clinical trials: application to multiple sclerosis. IEEE Trans Med Imaging, 2002. 21(10): p. 1280-91.
Zitova et al., Image registration methods: a survey, Image and vision computing, vol. 21 Issue 11, pp. 977-1000, 2003.

* cited by examiner

QUALITY CONTROL AND ASSURANCE OF IMAGES

TECHNICAL FIELD

This present invention relates generally to the quality control and assurance of image processing steps. More specifically, the invention relates to methods and apparatuses for determining if images should be included in data sets.

BACKGROUND

Neuroimage analysis requires the processing of image data through "pipelines", composed of multiple different steps (Zijdenbos, A. P., R. Forghani, and A. C. Evans. IEEE Trans Med Imaging, 2002. 21(10): p. 1280-91.). In large-scale longitudinal studies, pipelines generate thousands of intermediary and final images. Each step must be verified to ensure proper completion, a process referred to as quality control. Further, each process performed needs to be evaluated for correctness, a process referred to as quality assurance. Typically, quality control and assurance is performed visually (Simmons, A., et al., Int J Geriatr Psychiatry. 26(1): p. 75-82.), but this is increasingly prohibitive.

This problem became particularly acute as applicants analyzed MRIs from the large, multi-centric Alzheimer's disease Neuroimaging Initiative (ADNI). In ADNI, MRIs were acquired for >800 subjects at every 6 months over 3 years. Pipelining the whole data set for even simple analyses, e.g. voxel-based morphometry, resulted in more than 40,000 images for review. Applicants' objective was to devise an automated quality control and assurance system able to assess every pipeline step.

Automated image-processing pipelines must be robust to variations, if they are to provide reliable and reproducible measurements that have clinical meaning. Once images have been properly processed, they are better starting material for further processes in a pipeline where the ultimate objective can be diagnosing diseases such as multiple sclerosis (Zijdenbos et al.) or Alzheimer's disease (Duchesne et al., PCT/CA2010/000140).

Zijdenbos et al. suggest that, while fully automated quality control is desirable, visual inspection is still necessary in order to perform quality assurance, i.e. ensure that the processing step achieved the required performance level.

The drawbacks of current methods for analysing large volumes of image data causes human intervention to be time consuming and inefficient. There is a need for methods and apparatuses that have better quality control/assurance, leading to the absence of human intervention, or at least leading to less human intervention for final quality decisions.

SUMMARY

Applicants have discovered a multi-layer quality control/quality assurance system provides higher quality data, without human intervention, by rejecting images that do not achieve a pre-determined quality threshold. A first layer of quality control tracks processing execution and flags images with a failure state for review. These flagged images can be sent to a subsequent quality assurance layer for further analysis. A second layer checks for correctness of intermediary images and flags outliers for further analysis, or not, by a subsequent layer, such as layer 3, which presents flagged images in a practical and user-friendly way for rapid human visualization.

In some embodiments of the present invention, there is provided a new method of processing an image from a data set through a pipeline wherein quality control and assurance allows to determine a quality of the image processing, the method comprising; receiving a test image; pre-processing the test image; registering the test image to a reference image; calculating a test image quality using a correlation or otherwise of image intensity values between corresponding locations of the test image and the reference image; providing a plurality of training images and calculating training image quality distribution statistics for the training images with respect to the reference image; and relating the test image quality to the training image quality distribution.

In some embodiments of the present invention, the test image is rejected when the quality is less than minus 3.5 standard deviations from an average training image quality.

In some embodiments of the present invention, there is provided a new apparatus for processing a test image from a data set through pipelines allowing to determine a quality of the test image processing comprising: an image pre-processor for pre-processing the test image; an image registrator for registering the test image to a reference image; a test image quality calculator for calculating a correlation or otherwise between corresponding intensity data points between the test image and the reference image; a training image quality distribution generator for generating a distribution of quality values for a plurality of training images with respect to the reference image; and a test image quality determinator for relating the test image quality to the training image quality distribution.

BRIEF DESCRIPTION OF THE DRAWINGS

The invention will be better understood by way of the following detailed description of embodiments of the invention with reference to the appended drawings, in which.

DETAILED DESCRIPTION

Applicants have embedded a three-layer quality control system in a pipeline architecture. The first layer tracks process execution and flags images with a failure state for review, and can be seen as the embodiment of quality control. The second layer checks intermediary images, and flags outliers, and can be seen as the embodiment of quality assurance. The third layer can be a web-based interface for visual quality control, used to verify all flagged images. Applicant's initial implementation of the second layer's system is focused on linear registration quality assessment, one of the many possible processing steps in medical image pipelines.

One particularity of the Applicant's quality assurance system is the sub-sampling of the data for purposes of calculating a quality score by correlation or otherwise of the intensity in the images. In one embodiment, Applicants used selected 2D slices from the complete 3D volume to estimate the quality score. Other sampling schemes, geometric, statistical or otherwise, are possible, as long as the quality score remains representative of the whole dataset, and the purpose of reducing the computational need is preserved.

Applicants included baseline 3D T1-weighted sagittal MRI for 820 subjects recruited at baseline in the ADNI study (Mueller, S. G., et al., Alzheimers Dement, 2005. 1(1): p. 55-66). Scans were acquired on 56 different 1.5T scanners (GE Medical Systems; Siemens Healthcare; Philips Healthcare). The reference image is a high resolution (1 mm isotropic), high signal-to-noise average of 27 T1-weighted images of a single human brain, aligned in a pseudo-Talairach space (Aubert-Broche, B., A. C. Evans, and L. Collins, Neuroimage, 2006. 32(1): p. 138-45).

Image processing processed all volumes identically on applicants' local high-performance computing platform. Applicants' pipeline is based on the MINC image processing toolbox. Steps can include:

(1) DICOM to MINC conversion;
(2) regridding;
(3) non-local means noise removal (Coupe, P., et al., IEEE Trans Med Imaging, 2008. 27(4): p. 425-41);
(4) intensity inhomogeneity correction (Sled, J. G., A. P. Zijdenbos, and A. C. Evans, IEEE Transactions on Medical Imaging, 1998. 17: p. 87-97);
(5) global affine registration to the reference image (Collins, D. L., et al., Journal of Computer Assisted Tomography, 1994. 18: p. 192-205), based on mutual information (Maes, F., et al., IEEE Trans Med Imaging, 1997. 16(2): p. 187-98);
(6) 1 mm isotropic resampling;
(7) linear intensity clamping;
(8) extract volume of interest based on tissue-specific masks;
(9) intensity standardization;
(10) non-linear alignment.

Following at least some of the above processing steps, and as one possible implementation of quality assurance of linear registration, Applicants implemented the following algorithm:

Extract JPEG images from the 3D MRI in three centered orthogonal planes (transverse; sagittal; coronal);
Extract image information on each JPEG within the reference image brain mask;
Compute cross-correlation between a subject's image (the test image) and the reference at each orientation, as a registration quality index;
Compute quality index distribution statistics from a training set of images;
Compute z-scores for any new subject image against the training distribution;
Reject an image if its z-score on any orientation is outside 3.5 standard deviations from the mean.

Applicants performed manual quality control on every 820 intermediary and final images to identify outliers. In particular, images were flagged if linear registration failed to correctly align the subject's image with the reference in any of the three orientations. For the purpose of their demonstrating the usefulness of the invention, Applicants then split the subjects in two groups: (a) the training set, composed of 410 subjects that passed quality control; and (b) a testing set, composed of all remaining subjects, including all those that failed visual quality control. Applicants used their automated system to analyze processing in the testing set, and report accuracy, sensitivity and specificity of the technique.

Applicants automatically processed all 820 ADNI images. The tracking quality control system identified one process failure (1/820 or 0.1% failure rate). Manual quality assurance identified 24 linear registration failures (24/819 or 2.9% failure rate). Total failure rate was 25/820 or 3.0%.

Applicants trained their automated quality control and assurance system on 410 "good" images and tested on the remaining 409 images. The system correctly identified 24 of 25 failures, with 2 true negatives and 1 false positive. This translates into 96% specificity (proportion of true positives over true and false positives); 99.5% sensitivity (proportion of true negatives over true and false negatives); and 99.3% accuracy (proportion of true positives and true negatives over all images).

Applicants' simple yet effective system can identify automatically processing failures, such as linear registration, within a large-scale processing environment.

Linear registration has been described in detail elsewhere and is not part of the inventive concept provided herein. Rather, the inventive concept lies in the use of linear registration as one part of a quality assurance system/method that can examine every step of a processing pipeline.

Figure 1:
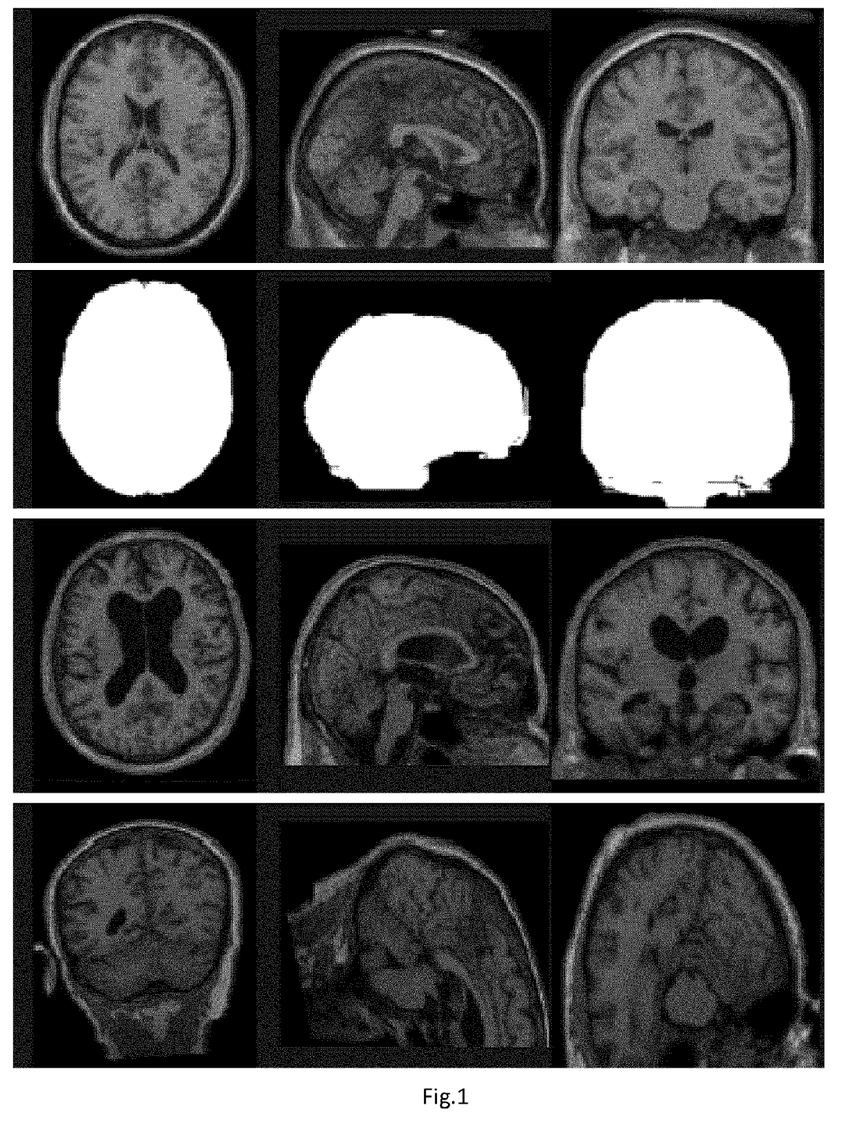
FIG. 1 shows examples of reference images (top row), masks ($2^{nd}$ row) and test images that passed ($3^{rd}$ row) and failed ($4^{th}$ row) the quality assurance method of the present invention.

FIG. 1 shows examples of reference images (top row), masks ($2^{nd}$ row) and test images that passed ($3^{rd}$ row) and failed ($4^{th}$ row) the quality control method of the present invention. Applicants' initial implementation of automated image quality control focused on linear registration of new images to the Colin27 reference target (top row). Applicants extracted information from each registered image (e.g. 3rd row) within specific brain masks (e.g. 2nd row). The cross-correlation scores between within-mask information of subject and reference images guide the automated quality control system. While failure is obvious in some cases (e.g. $4^{th}$ row) it is not as readily apparent for an automated process in other cases (e.g. 5th row).

Figure 2:
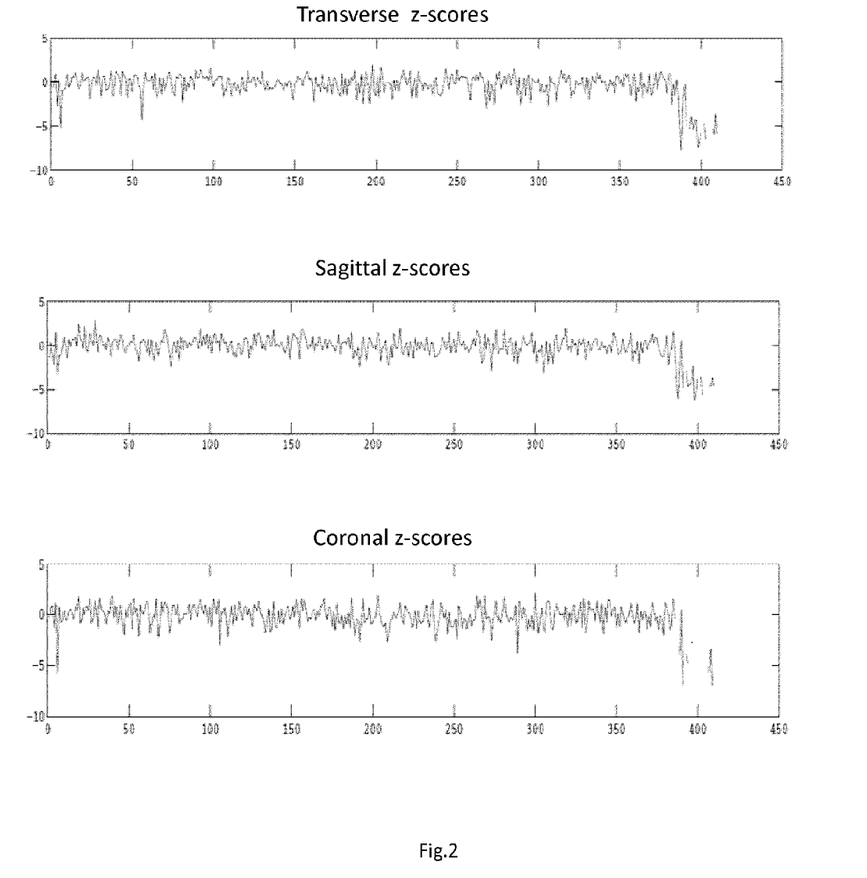
FIG. 2 shows correlation scores for transverse ($1^{st}$ row), sagittal ($2^{nd}$ row) and coronal ($3^{rd}$ row) of the 409 test images.

FIG. 2 shows cross-correlation z-scores for transverse ($1^{st}$ row), sagittal ($2^{nd}$ row) and coronal ($3^{rd}$ row) of the 409 registered images in the testing set. The 24 known failed images were regrouped at the end of the dataset; the decrease in z-scores is associated with 99.3% accuracy. It can be observed from FIG. 2 that almost all the images that are part of the training set vary around a z-score of 0 while the "failed" images (FIG. 1 row 5) clearly show lower z-scores. Images that were not able to obtain a z-score fail altogether and do not appear on the graph (FIG. 1 row 4).

Z-scores are representative of a correlation between one data point and a data set. The Z value describes whether a data point is above or below average and how far it is from that average. It is calculated as the difference between the data point value and the average of the data set value divided by the standard deviation of the data set, $z=(x-\mu)/\sigma$. In one embodiment of the present invention, an image is rejected when the quality (correlation or z-score) of the test image is more than 3.5 standard deviations from the mean quality of the training set of images. In all cases, the quality is obtained by comparing the intensity value of each pixel/voxel of a registered test image to the corresponding intensity value of each pixel/voxel of the reference image (see FIG. 3).

Figure 3:
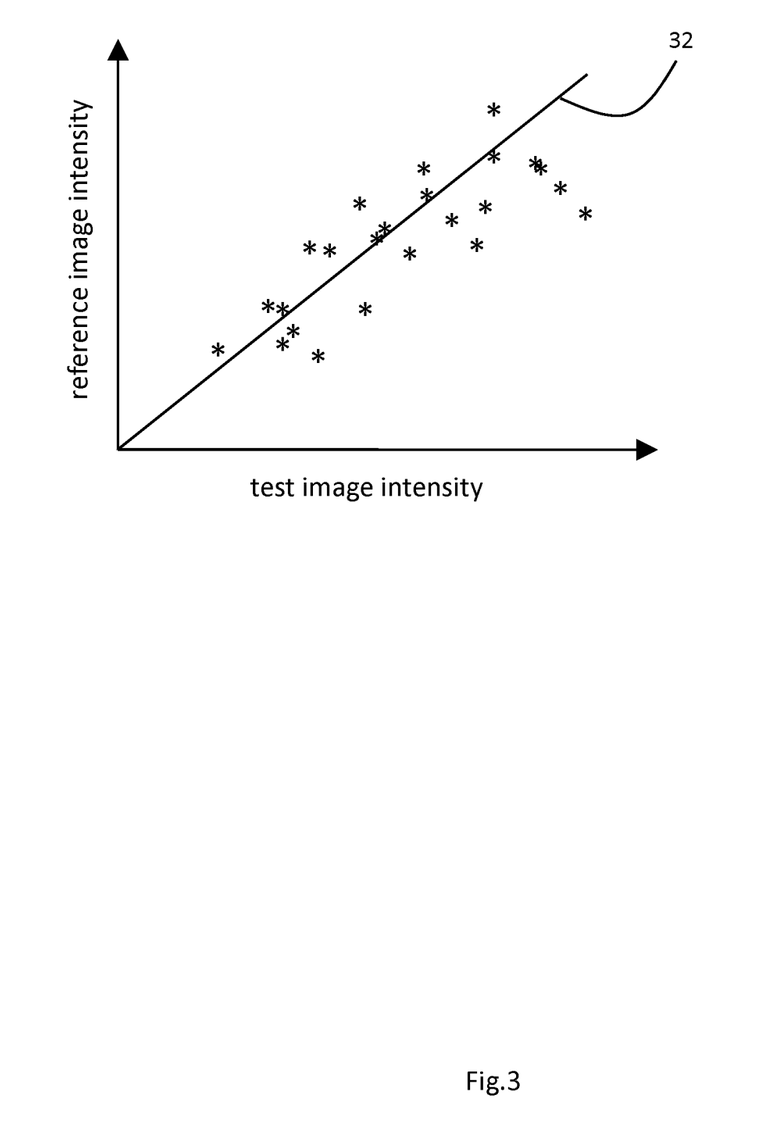
FIG. 3 shows a graph of test image vs. reference image correlation (quality) for each intensity data point.

FIG. 3 shows an example of a plot of test vs. reference image intensities for each location (pixel/voxel) on an image to determine a correlation (quality). The graph is used for image quality determination according to the present invention. The quality of an image is the cross-correlation value (or coefficient of determination or $r^2$) between the test and reference image pixel/voxel intensity values. For example, if the images are identical, the correlation is 1 (see FIG. 3) and all points line up with the solid line 32.

Figure 4:
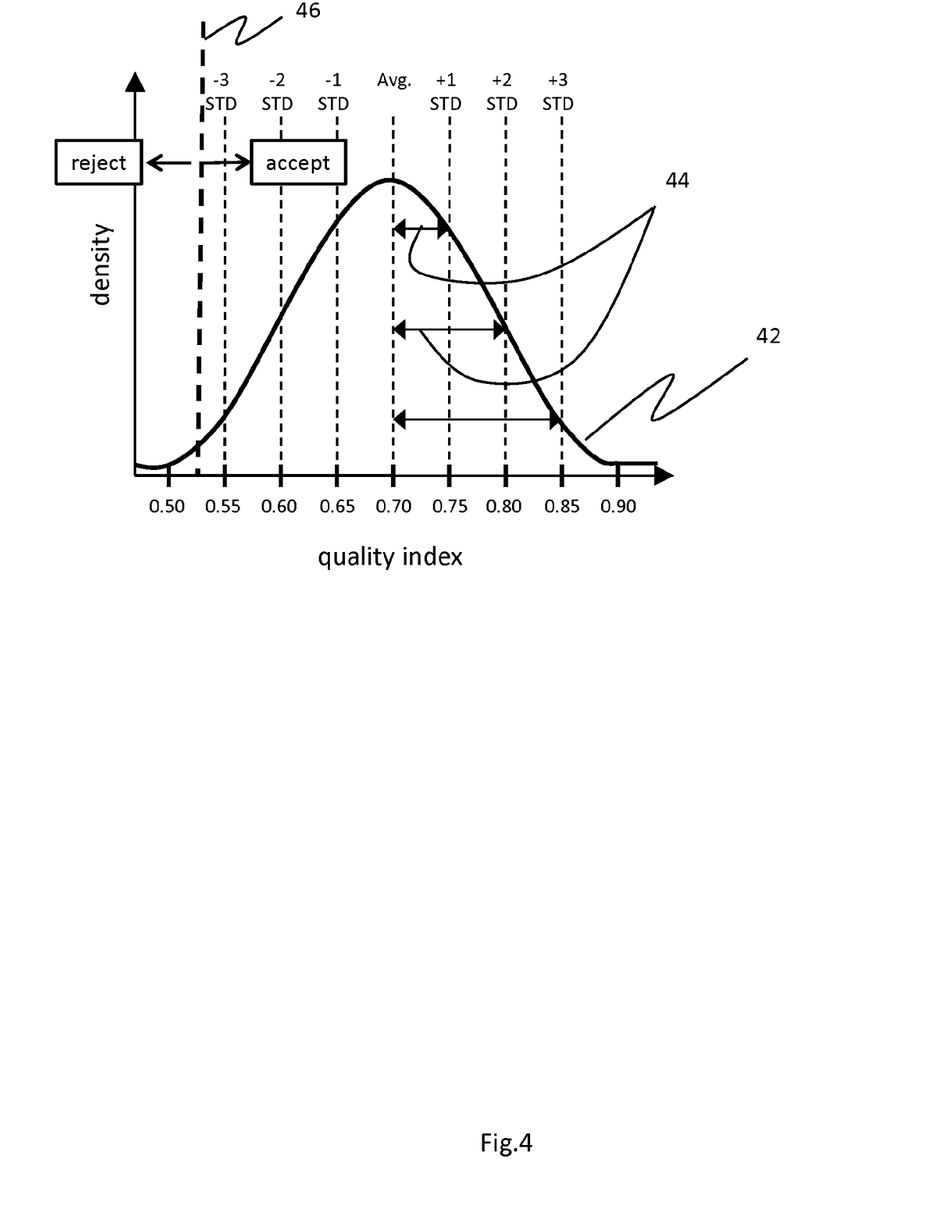
FIG. 4 shows a graph of training image quality distribution, highlighting the quality score below which an image is rejected.

FIG. 4 shows a graph of training image quality distribution 42 where the average quality index is 0.70, highlighting the quality score below which an image is rejected. In order to generate a distribution of quality scores for images, a significant number of images are required. The more images are used to "train" the system; the better will be the Quality determination. It will be understood that the training image set can be taken directly from the data set under study after having removed "failed" images or not. The training images can also be taken from another data set and be used to determine quality (acceptability) of test images. The graph in FIG. 4 shows an average quality score obtained (in this example 0.7) as well as 1 to 3 standard deviations 44 brackets from the mean, in both the positive and negative directions. It will be understood that, in one embodiment, images with quality (z-score) more than 3.5 standard deviations will be rejected. In such an embodiment, the cut-off line 46 is placed at −3.5 standard deviations from the mean and is used for determination of rejection of an image. It will also be understood that quality is synonymous with correlation such that a 0.7 quality is a 0.7 correlation between the intensity values of two corresponding images. It will further be understood that corresponding images mean images that have been linearly registered to each other, in this case, a test image linearly registered to a reference image. When two images are used in a pre-processing step in such a way that the reference image is the image prior to the processing step and the test image is the image after the processing step, it will be considered that the images are registered (due to the fact that they are based on the same image). Registering should be understood as any method to ensure that the two images at least partially correspond to each other in order for the quality control to be useful. An image prior to and after being subjected to a pre-processing step (such as, for example, de-noising) would be considered to be very well registered. Other images would need to have an identity registration (e.g. inhomogeneity fields), as the quality assurance for these types of images (e.g. smoothness) does not rely on a separate reference.

Figure 5:
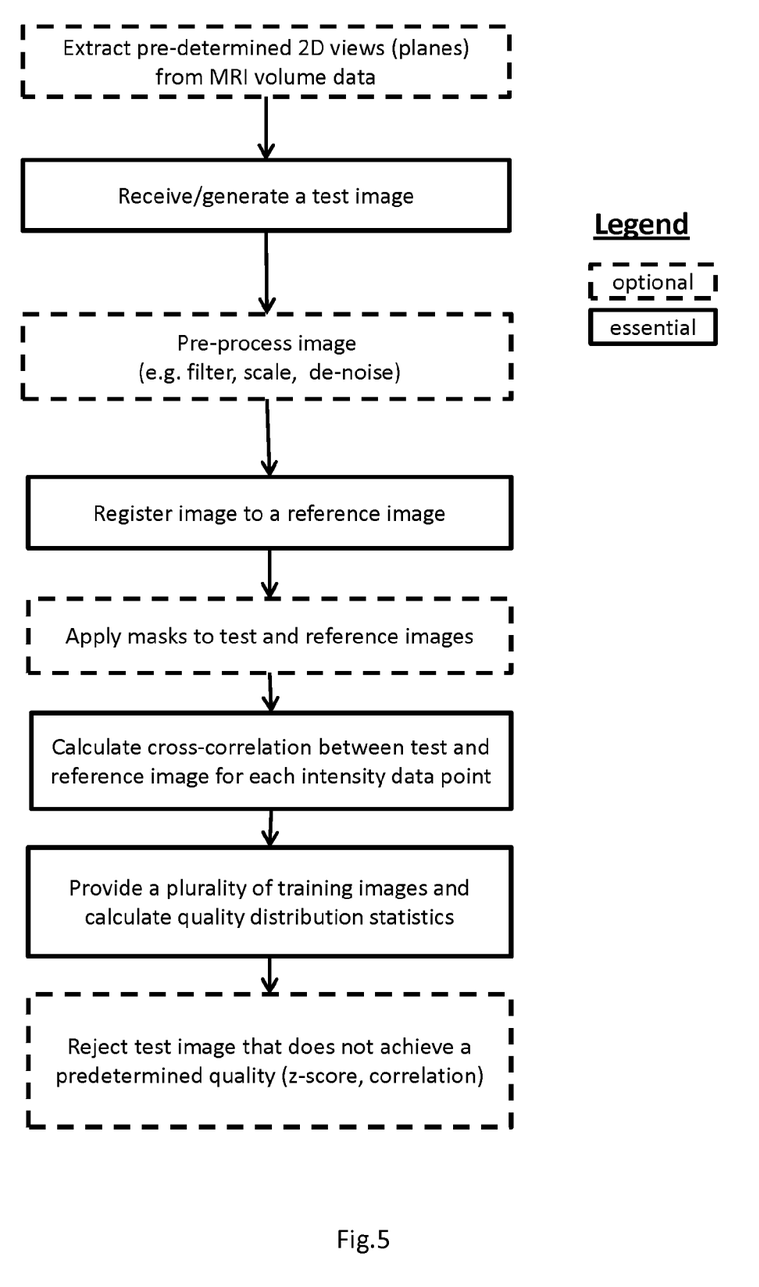
FIG. 5 shows a method for image quality assurance determination according to the present invention.

FIG. 5 shows one embodiment of a method for image processing quality determination according to the present invention. Essential steps are shown as boxes with full black lines while optional steps are shown as boxes with dashed black lines. Typically, when analyzing MRI data, a volume of data is available for a patient receiving a brain scan. This volume of data can be analyzed in its entirety but, alternatively, specific slices, sections or planes of the MRI volume data can be selected, either through geometric or statistical sampling. In the present invention, it can be useful to select corresponding image slices of transverse, sagittal and coronal sections and thus generate two dimensional image views from three dimensional data. If properly done, this will have the added advantages of using less time and computing/processing power to achieve similar results.

Once a test image is received, it is pre-processed according to methods known in the art which can comprise de-noising, intensity standardization, scaling etc. Defects in the registering the test image to a reference image is the quality assurance step that is verified in the present example. In order to achieve this quality assurance step, a cross-correlation is calculated between each intensity data point from the test and reference images. A correlation between the two images is obtained. If not already provided, a plurality of "training images" is then used to train the system in order to generate "quality" (correlation) distribution statistics. The "training" images can be taken from the data set being studied or the system can be trained prior to performing the method. The better and more representative the quality distribution statistics, the more likely an outlier can be identified. The purpose of generating or providing quality distribution statistics is to determine how "correlated" a test image is to an average test image, both with respect to a reference image.

The nature of the reference image is very important. In the embodiments provided herein, reference images are taken from Colin27 image set. The distribution statistics of the training set are used to calculate the average quality and the standard deviation of the quality. In some embodiments, a z-score can be used to calculate threshold value that is used to accept (for example z-score less than 3.5) or reject (for example z-score more than 3.5) a test image and thus remove it from a data set of images. Applicants have found that using a z-score of 3.5 gives good results. It will be appreciated, however, that any z-score or any other statistical measure can be used in order to accept or reject images and that lower or higher z-scores will simply make the process more or less stringent, respectively. It will be appreciated that, as seen in FIG. 4 and throughout the present document, referring to a z-score of less than minus 3.5 standard deviations from the average is the same as having a z-score more than 3.5 standard deviations from the average (on the negative side). The Z-score cut-off line is typically negative value because the test image is correlated to the reference image in order to establish a minimal correlation or a lower quality limit.

It will be appreciated that the reference image can be taken from a recognized or standard set of images, such as the Colin27 image set. However, in some embodiments, the reference image can be an average of the training set of images used to generate the quality distribution curve shown in FIG. 4.

Figure 6:
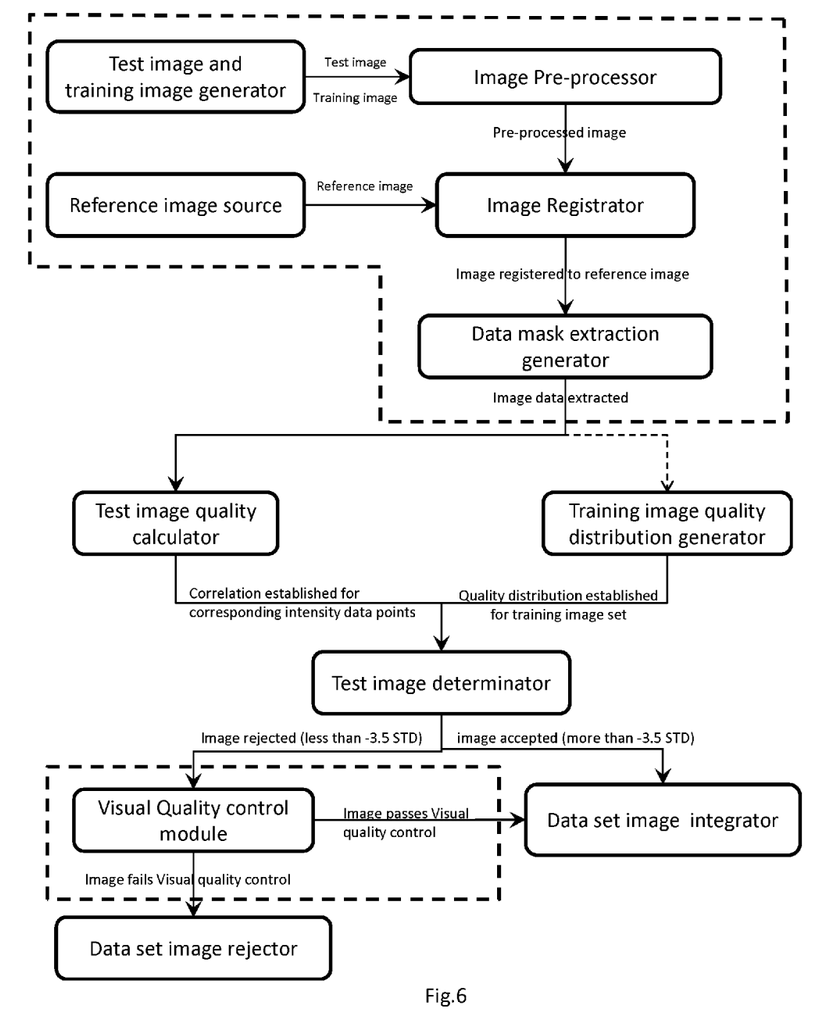
FIG. 6 shows a block diagram illustrating various components of an apparatus for image quality determination.

FIG. 6 shows a block diagram illustrating various components of an apparatus for image quality determination. In such an apparatus, a source of test images and a source of training images and a source of reference images are required. An image pre-processor pre-processes the images to facilitate registration by the image registrator. Masking with the component isolator is an optional part of the present invention, as shown by the fact that it is included inside a dashed-line box. A test image quality calculator is provided to determine the quality of the test image with respect to the reference image. When the training set of images is from the same data set from which the test image originates, a Training image quality distribution generator is also required to calculate the distribution statistics for this training image set with respect to the reference image. When an external training image set or external training distribution statistics are provided, there is no need for a Training image quality distribution generator. The test image determinator then determines whether a test image has passed the quality assurance threshold (in this case, more than 3.5 standard deviations from the mean quality of the training set of images) based on the provided statistics (mean and standard deviation of the training set).

Once acceptability of the test image has been determined, image data can be transmitted to another location/computer but either way, a Data set image integrator will allow the test image to be part of the final data set.

If, on the other hand, the test image has failed the quality assurance step, it can optionally be submitted to a Visual Quality control module (such as that of Zijdenbos et al.) for visual determination of quality through human intervention (this step is optional because it is included inside a dashed-line box). Alternatively, if the image has not passed the quality assurance step, a Data set image rejector removes the test image from the data. It will be appreciated that most aspects of this diagram can be performed by a computer using software programmed to carry out the described parts.

Figure 7:
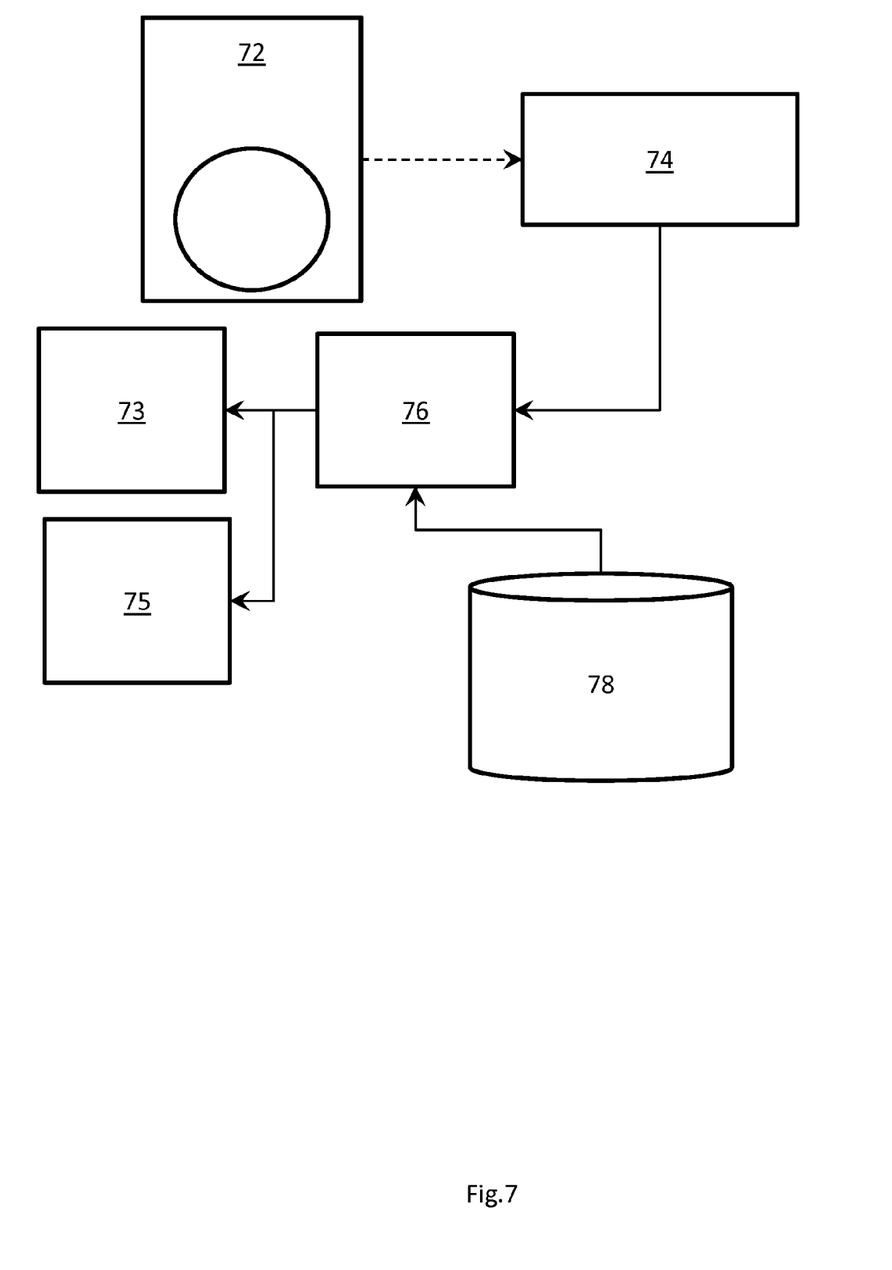
FIG. 7 shows a block diagram illustrating a physical embodiment of the present invention.

FIG. 7 shows a block diagram illustrating a physical embodiment of the present invention. In this setup, a subject is placed inside an MRI machine 72 for generating an image of his brain. In this case the imaging is performed by radio frequency emitters/sensors that are placed inside the MRI machine. The RF sensors can send data to an image capture device for generating a viewable image of the brain. The image (test images and training images) are sent to a test image and training image acquisition device 74 where a processor 76 allows to pre-process or process the images thereby generated. After pre-processing, the images are ready to be registered with a reference image representing the same "brain volume" obtained from a database of reference images and masks 78. After registration of the image to the reference image, masks can applied in order to ensure comparing similar regions/volumes/sections. Masks can also be obtained from a mask database.

A processor/calculator analyzes all intermediary images from a processing pipeline and determines acceptability of the image for use in a data set. It will be appreciated that generating an image with an image generation device such as an MRI machine, can, but need not be part of the physical embodiment of the present invention. Image data can be received independently of an MRI machine. Furthermore, a completely automated system would not require an image viewer 73 for human intervention or "final" quality assurance. In some embodiments, the image data can be transmitted and/or sent over a network using a data transmitter 75.

It will be understood that, although the invention presented herein has been described for applications of MRI scans of the brain, it will be appreciated that it can also serve for other applications such as, for example, satellite image interpretation for defence applications and many other applications where image correlation and similarity plays an important role, or when "before and after" pictures are studied for differences.

It will be understood that intensity values are the type of data being gathered for use with the present invention. However, in some embodiments, intensity values are converted to other types or forms of data via mathematical operators (e.g. to form gradients) or pre-analyzed (e.g. computation of signal-to-noise-ratio) before correlation and quality distributions are performed.

It will be understood that linear registration is an advantageous part of pre-processing or processing of the present invention because the test image being compared to reference images needs to be "forced" to correspond as much as possible. For this reason, when comparing an image to a reference image, such as a reference image from a library, it is necessary to perform linear registration of the test image to ensure optimal correspondence with the reference image. However, in some embodiments of the present invention where the quality of a test image is compared before and after a processing step, it will be understood that both images pre- and post-processing, are considered to be "registered".

It will be understood by those skilled in the art that, even though the examples presented herein show whole brain images (slices), the invention can work advantageously by using specific and predetermined areas, regions, loci, nuclei of the brain. For some applications, where the size of the hippocampus is what is being studied, MRI scans of the whole brain can be cropped to the hippocampus and surrounding area.

It will also be understood that rejecting an image if it has less that a predetermined quality is the same as accepting an image that has more than a predetermined quality. Applicants have found that −3.5 standard deviations is an advantageous quality value (z-score) for use in the present invention. In other embodiments where a less stringent quality control is required, a z-score of −2 standard deviations could also be advantageous. It will be appreciated that any useful predetermined z-score value can be used. Although pre-processing images is an important part of many embodiments of the present invention, the quality of some images do not need a pre-processing step to be submitted to quality control.

In some embodiments, the processing pipeline can comprise a step being applied to the test image and to the plurality of training images, and the calculation of training image quality distribution statistics for the training images with respect to the reference image comprises using the training images as processed according to the same processing step so that image quality distribution statistics are specific to that processing step, and relating a test image quality to a training image quality distribution is also specific to the processing step.

In some embodiments, the processing step can be included in the pipeline when the "relating" confirms a quality of the processing step as related to the test image and the processing step is excluded from the pipeline when the "relating" confirms a lack of quality of the processing step as related to the test image. In such an embodiment, the "quality assurance" results can be used to improve or optimize the processing pipeline, by adding or removing elements, parameters or processing steps from the pipeline.

While the invention has been described in connection with specific embodiments thereof, it will be understood that it is capable of further modifications and this application is intended to cover any variations, uses, or adaptations of the invention following, in general, the principles of the invention and including such departures from the present disclosures as come within known or customary practice within the art to which the invention pertains and as may be applied to the essential features herein before set forth, and as follows in the scope of the appended claims.

What is claimed is:

1. A method of processing an image from a data set through a pipeline wherein quality assurance allows to determine a quality of said image processing, said method comprising;
   receiving a test image;
   registering said test image to a reference image;
   calculating a test image quality using a correlation of image intensity values between corresponding locations of said test image and said reference image;
   providing a plurality of training images and calculating training image quality distribution statistics for said training images with respect to said reference image; and
   relating said test image quality to said training image quality distribution.

2. The method of claim 1, further comprising rejecting said test image when said quality is less than a predetermined quality with respect to said training images.

3. The method of claim 2, wherein said predetermined quality is more than 2 standard deviations from an average training image quality.

4. The method of claim 2, wherein said predetermined quality is more than 3.5 standard deviations from an average training image quality.

5. The method of claim 1, further comprising pre-processing said test image before calculating said quality; wherein said pre-processing comprises one or more of filtering, de-noising, heterogeneity correction, re-sampling and smoothing.

6. The method of claim 5, wherein said pre-processing comprises an automatic quality control system.

7. The method of claim 1, wherein said pipeline comprises a processing step, said processing step being applied to said test image and to said plurality of training images, said calculating training image quality distribution statistics for said training images with respect to said reference image comprising using said training images as processed according to said processing step so that said image quality distribution statistics are specific to said processing step, and said relating said test image quality to said training image quality distribution being specific to said processing step.

8. The method as claimed in claim 7, wherein said processing step is included in said pipeline when said relating confirms a quality of said processing step as related to said test image and said processing step is excluded from said pipeline when said relating confirms a lack of quality of said processing step as related to said test image.

9. The method of claim 1, further comprising visualizing flagged images using a user-friendly quality assurance system.

10. The method of claim 1, wherein said test image information is extracted from one or more masks of said reference image.

11. The method of claim 1, further comprising submitting corresponding sagittal, coronal and transverse section types to said method and rejecting all corresponding section types when at least one section type is rejected.

12. The method of claim 1, wherein said reference image is obtained from the Colin27 set of MRI brain images.

13. The method of claim 1, wherein said registering comprises linear and non-linear registration.

14. The method of claim 1, wherein images are MRI images of the brain.

15. An apparatus for processing a test image from a data set through pipelines allowing to determine a quality of said test image processing comprising:

an image registrator for registering said test image to a reference image;

a test image quality calculator for calculating a correlation or otherwise between corresponding intensity data points between said test image and said reference image;

a training image quality distribution generator for generating a distribution of quality values for a plurality of training images with respect to said reference image; and a test image quality determinator for relating said test image quality to said training image quality distribution.

16. The apparatus of claim 15, further comprising an image rejector for rejecting said test image when said quality is less than training predetermined image quality.

17. The apparatus of claim 15, further comprising an image pre-processor for pre-processing said test image; wherein said image pre-processor provides one or more of filtering, de-noising, heterogeneity correction, re-sampling, smoothing of said image prior to said registering.

18. The apparatus of claim 15, further comprising a visual display for displaying one or more of image data, quality data and quality distribution data.

19. The apparatus of claim 15, further comprising a visual quality control module for visualizing rejected images.

20. A method of processing medical images through a pipeline wherein quality control and assurance allows to determine a quality of a medical image processing comprising;

providing a test medical image registered to a reference image;

calculating a test image quality using a correlation of image intensity values between corresponding locations of said test image and said reference image;

relating said test image quality to a training image quality distribution; and determining whether said image should be rejected based on said relating.

* * * * *